United States Patent [19]
Burnham et al.

[11] Patent Number: 5,188,414
[45] Date of Patent: Feb. 23, 1993

[54] PICK-UP TRUCK WITH AUXILIARY LOAD COMPARTMENT

[75] Inventors: Robert E. Burnham, Novi; Roy E. Bonnett, Bloomfield, both of Mich.

[73] Assignee: Ford Motor Company, Dearborn, Mich.

[21] Appl. No.: 812,545

[22] Filed: Dec. 23, 1991

[51] Int. Cl.⁵ .......................................... B60R 11/06
[52] U.S. Cl. ................................. 296/37.6; 296/24.1
[58] Field of Search ........................ 296/37.6, 24.1; 224/42.42

[56] References Cited

U.S. PATENT DOCUMENTS

| 4,288,011 | 9/1981 | Grossman | 224/42.42 |
|---|---|---|---|
| 4,488,669 | 12/1984 | Waters | 224/273 |
| 4,770,330 | 9/1988 | Bonstead et al. | 224/42.42 |
| 4,892,345 | 1/1990 | Rachael, III | 296/24.1 |
| 4,892,346 | 1/1990 | Berlin | 296/37.6 |
| 4,917,430 | 4/1990 | Lawrence | 296/37.6 |
| 4,936,624 | 6/1990 | West | 296/37.6 |
| 5,088,636 | 2/1992 | Barajas | 224/42.42 |

Primary Examiner—Robert R. Song
Attorney, Agent, or Firm—Daniel M. Stock; Clifford L. Sadler

[57] ABSTRACT

An improved pick-up truck includes an integral auxiliary load compartment positioned between the cab and the load box of the pick-up, the auxiliary load compartment having lateral side walls which extend in parallel planar relationship with adjacent portions of the cab and load box.

21 Claims, 3 Drawing Sheets

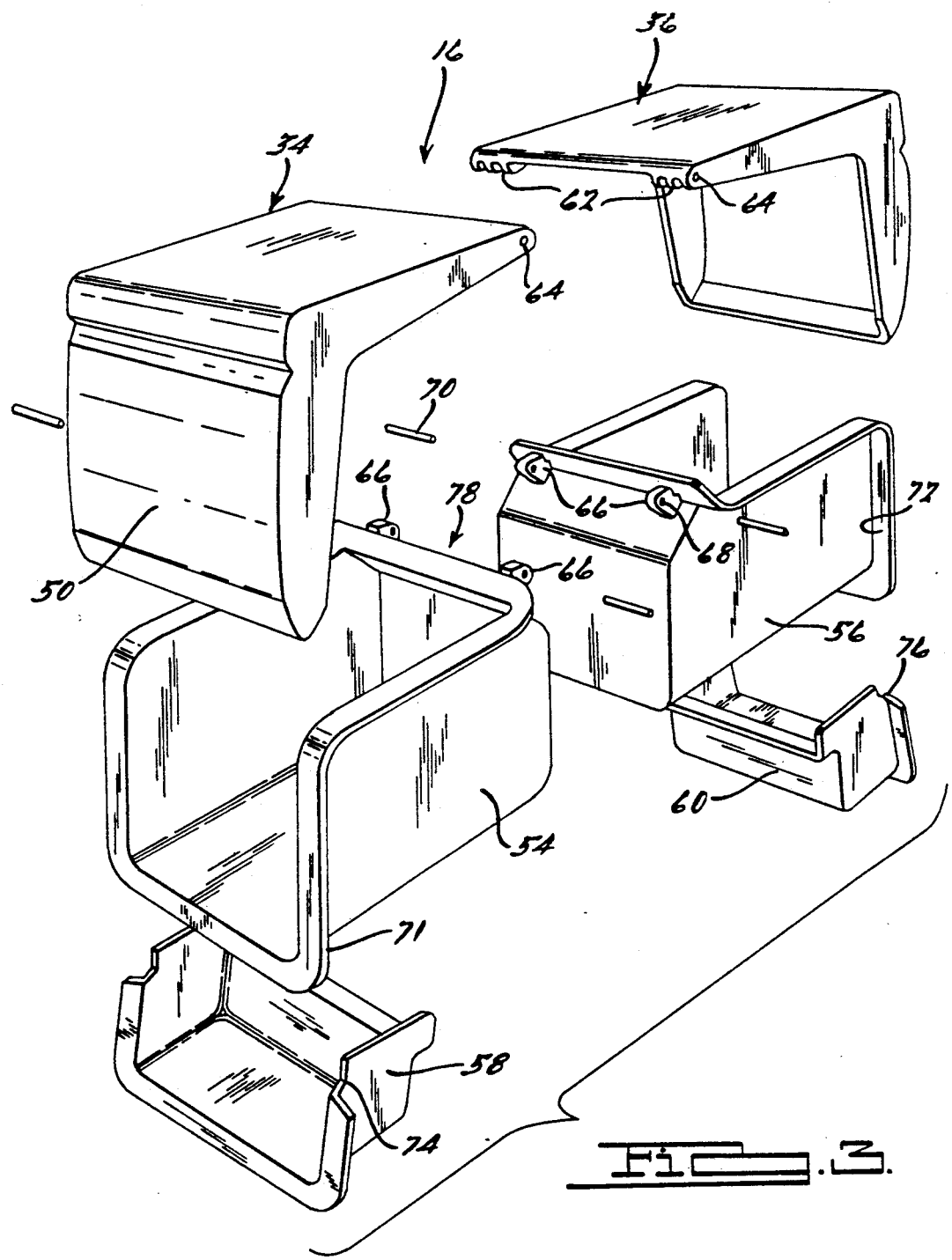

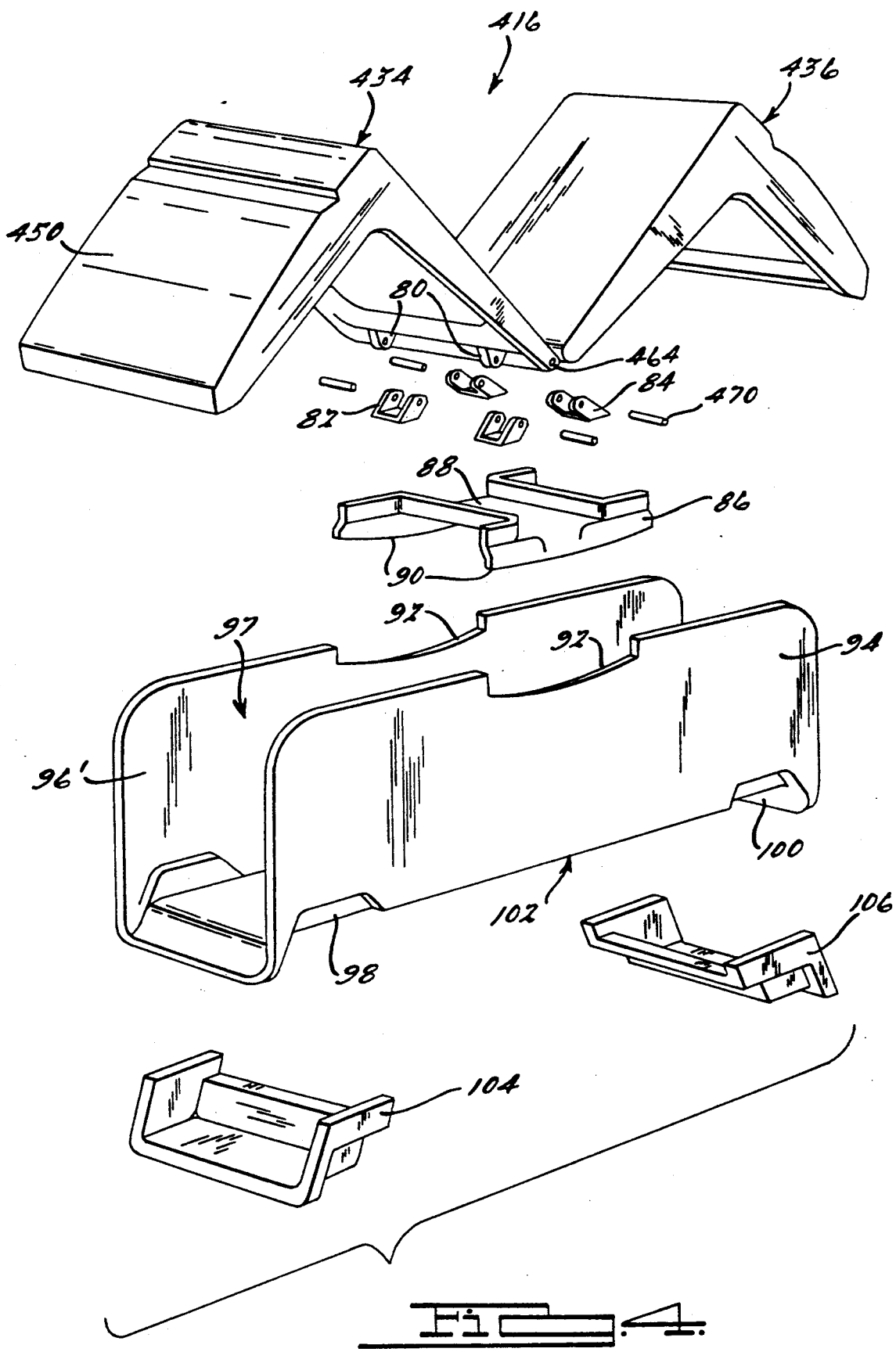

PICK-UP TRUCK WITH AUXILIARY LOAD COMPARTMENT

BACKGROUND OF THE INVENTION

1. Field of the Invention

The present invention relates generally to pick-up trucks, and more specifically to the provision of an auxiliary closable compartment separate from the normal cab and load box portions of a pick-up truck.

2. Description of the Prior Art

In the construction pick-up trucks, it is known to provide enclosed storage areas beyond that normally associated with the driver's cab portion of the truck. One example of such a storage area provision is that shown in U.S. Pat. No. 4,917,430 to Lawrence, which discloses a conversion design for an extended cab pick-up that provides a storage area behind the seating positions provided for driver and passengers with accessibility to the storage area being providing through an opening in the side wall of the portion of the pick-up truck cab longitudinally rearwardly spaced from the side door of the cab. In instances where the cab is configured to have the extended space behind the normal cab position, this provides an externally accessible storage space, but its utility is dependent upon the selection of the truck construction that includes the extended portion of the truck cab rearwardly arranged behind the normal cab enclosure. The stringent design considerations put upon the design of the overall truck cab construction itself can result in an inefficient layout of space, weight and expense for providing the auxiliary storage function.

In providing storage space within the load box of a pick-up truck, it is well known to provide drop-in container such as tool or utility boxes arranged to be received within the confines of the load box itself typically at the forward end of the box. Those shown in U.S. Pat. No. 4,288,011 to Grossman, U.S. Pat. No. 4,770,330 to Bonstead et al., U.S. Pat. No. 4,488,669 to Waters and U.S. Pat. No. 4,936,624 to West are exemplary of such constructions. Use of such containers generally necessitates the modification of the load box itself to securely fasten the container within the box, which was not designed to accept such a container, and all suffer from the disadvantage that they neither aesthetically, nor structurally, are integrated with the design of the pick-up truck itself.

SUMMARY OF THE INVENTION

The disadvantages are overcome in the pick-up truck of the present invention by providing a pick-up truck that includes an auxiliary load compartment positioned in the truck longitudinally intermediate a load box and the conventional pick-up truck cab.

According to one important feature of the present invention, the auxiliary load compartment includes longitudinally extending lateral side walls which blend aesthetically with adjacent side walls of the truck cab and load box in substantially flush planar relationship.

According to another feature, the auxiliary load compartment side walls are formed as part of closure members hingedly secured for pivotal movement with respect to longitudinal medial planes of the pick-up truck to permit movement between opened and closed positions.

According to yet another feature, the auxiliary load box is formed as a molded plastic member and may include at the lower terminus of its side walls a step portion projecting laterally inwardly with respect to the pick-up truck.

BRIEF DESCRIPTION OF THE DRAWINGS

These and other features of the pick-up truck of the present invention will be apparent to those skilled in the automotive vehicle body arts upon reading the following description with reference to the accompanying drawing in which:

FIG. 3 is an exploded perspective view of one embodiment of the auxiliary load compartment of the pick-up truck.

FIG. 4 is an exploded perspective view of another embodiment of the auxiliary load compartment.

DESCRIPTION OF THE PREFERRED EMBODIMENTS

Figure 1:
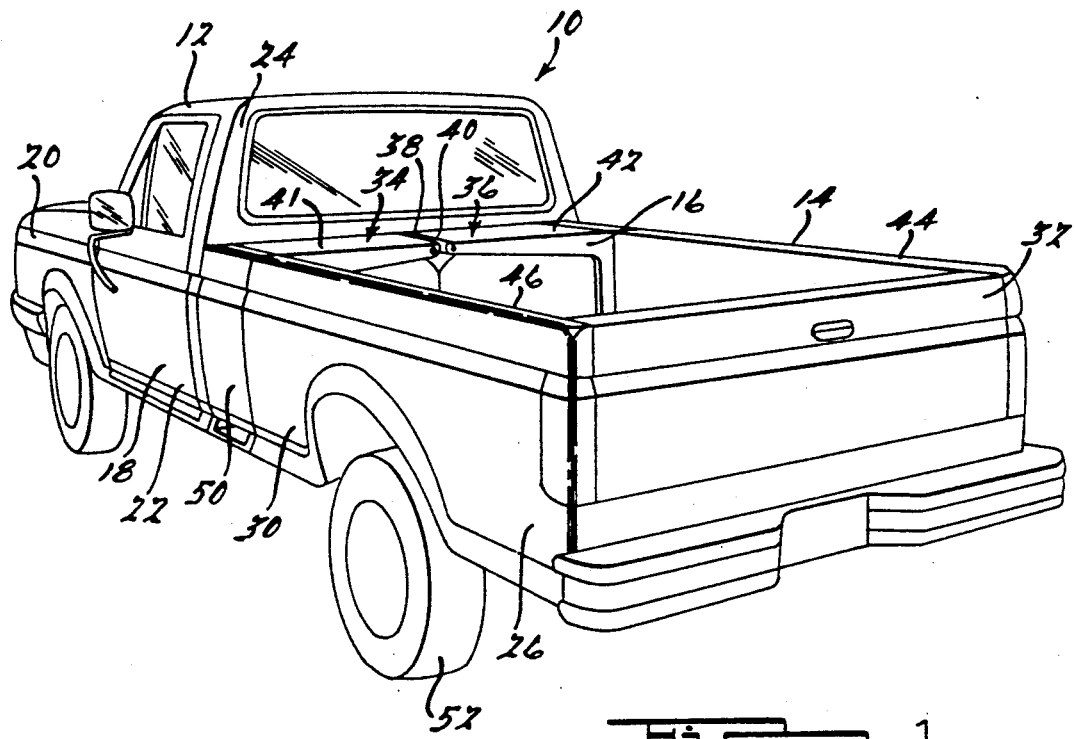
FIG. 1 is a rear perspective view of a pick-up truck according to the present invention.

Turning now to the drawings, and in particular to FIG. 1 thereof, a pick-up truck 10 is illustrated as including a cab 12, a load box 14, and an auxiliary load compartment 16. The cab 12 is preferably of conventional pick-up truck construction and includes a pair (one shown) of side walls, indicated generally at 18, which form rearwardly longitudinally extending side surfaces 20, 22 of the fenders and doors, respectively. The cab 12 terminates at its rear end in a vertically arrayed laterally extending rear wall 24.

Figure 2:
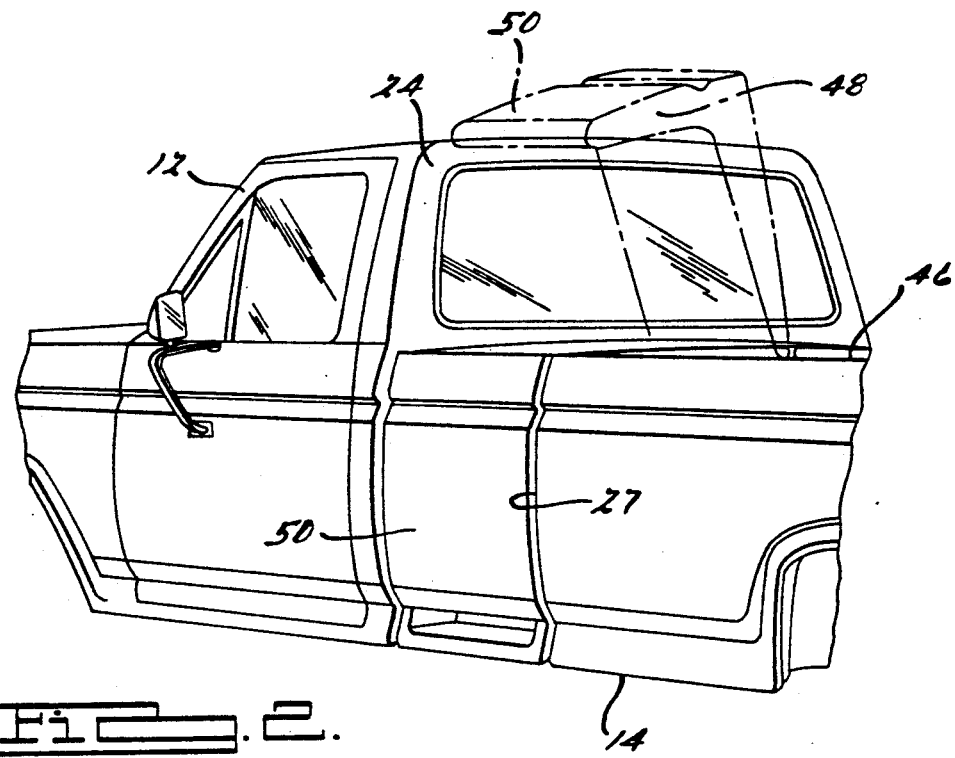
FIG. 2 is a partial perspective view of the pick-up truck of FIG. 1 showing movement of auxiliary load compartment closure members between opened and closed positions.

The load box 14 comprises a pair of side walls 26, 28 which, as can be seen in FIGS. 1 and 2, present external planar surfaces, such as indicated at 30, arranged in substantially flush planar relationship with the surfaces 20, 22 of fender and door of the cab 12, respectively. A laterally extending rear wall 32 is arranged at the rear end of the vehicle, and may be in a form of a tailgate, as illustrated in FIG. 1.

In the embodiments illustrated in FIGS. 1 and 2, the load box 14 is essentially three-sided with an open forward end terminated at its lateral sides by end portions of the side walls 26, 28, as indicated at 27 in FIG. 2. It will be appreciated by those skilled in the body arts, however, that the load box 14 may also be formed as a four-sided receptacle having a laterally extending forwardly positioned wall.

The auxiliary load compartment 16 is illustrated as comprising essentially a pair of closure members 34, 36 pivotally mounted as indicated at 38, 40 proximate the vertically longitudinal medial plane of the pick-up truck 10. The closure members 34, 36 are generally L-shaped members having an upper wall 41, 42, respectively, arranged in generally parallel flush relationship with upper surfaces 44, 46 of the side walls of the load box 26, 28, respectively. Each of the closure members 34, 36 also includes a lateral outer wall 48, which includes an outer surface, as indicated at 50, which is positionable to assume the generally flush planar relationship with the adjacent surfaces 22, 26 of the cab and load box, respectively, when in the position shown in FIG. 1.

The closure members 34, 36 may be latched in the position shown in FIG. 1 through conventional automotive latch assemblies, and may be released to move pivotally therefrom towards the position shown in the dotted line in FIG. 2 to provide access to storage volume positioned within auxiliary storage container 16.

It is to be understood that the construction of the pick-up truck 10 is preferably the conventional body-on-frame design in which the body portion of the cab 12 and the load box 10 are formed of metallic or plastic panels fixedly secured to a structural frame member which supports the cab 12 and the load box 14 and is connected through a suspension system to the load wheels 52.

Turning now to FIGS. 3 and 4, advantageous alternatives for constructing the auxiliary load box 16 are illustrated. The embodiment of FIG. 3 is that shown in perspective in FIG. 1 and includes the closure members 34, 36 pivotally mounted as indicated generally at 38, 40 to a pair of open boxes 54, 56, below which are mounted a pair of laterally inwardly extending step pockets 58, 60.

Each of the pairs of components, it will be noted, are identical and are symmetrically arrayed about the vertical longitudinal medial plane of the pick-up truck 10. Each of the L-shaped doors 34, 36, the boxes 54, 56, and the step pockets 58, 60 may be formed as one piece plastic molding. This fabrication technique permits the formation in the closure members 34, 36 of rib structure 62 aligned with journal holes 64 and the provision of hinge bosses 66 pierced by hinge pin holes 68 on the boxes 54, 56 for pivotally cooperative assembly for hinged movement about hinge pins 70 insertable through the bore 64, 68 in conventional fashion. Routine mounting structure not here disclosed can support the auxiliary load compartment 16 on the frame of the pick-up truck 10 and lateral stops ca be provided to retain the closure member 34 with box 54 and step insert 58 against lateral movement, as well as their symmetrical counterparts on the other side of the pick-up truck 10. For example, the outer lips 71, 72 of the boxes 54, 56, respectively, can be positioned to engage in notches 74, 76 of the step inserts 58, 60, respectively, which can in turn be mounted on the structural member, such as a frame. It will be appreciated, however, that in the embodiment of FIG. 3, the central base portion at which pivotal mounting is effected indicated generally at 78 between the two boxes 54, 56 may provide space therebetween.

Turning now to the FIG. 4 embodiment, an auxiliary load compartment 416 is illustrated as including a pair of identical closure doors 434, 436 of molded plastic plastic construction which each include a pair of integrally formed hinge bosses 80 and pin apertures 464 formed through the hinge bosses 80 and lateral surfaces of the closure members 434, 436. Mating hinge trunnions 82, 84 are provided for receiving pins 470 to hingedly mount the closure doors 434, 436. These hinge trunnions 82, 84 may be of known construction and are preferably secured to a molded mounting plate indicated generally at 86. Plate 86 includes a central hardware mounting area 88 to which the hinge 82, 84 may be secured and includes a base portion 90 configured to conform with notches 92 formed in upstanding side walls upstanding longitudinally spaced side walls 94, 96 of a generally U-shaped laterally extending compartment 97. Laterally spaced notches 98, 100 are provided on the underside 102 of the compartment for receiving step pockets 104, 106 for mounting in the pick-up truck 10. In fully assembled configuration, the step pockets 104 and 106 are assembled into the bottom of the compartment 97 to which is secured the mounting plate 86 defining a central base portion for pivotally mounting the doors 434, 466 in hinged fashion as shown, for pivotal movement as indicated in FIG. 2.

While only certain embodiments of the pick-up truck of the present invention are disclosed, those skilled in the automotive body arts will appreciate that others may be possible without departing from the scope of the appended claims.

We claim:

1. A pick-up truck comprising:
   a cab having a pair of vertically arrayed longitudinally extending side walls and a vertically arrayed laterally extending rear wall;
   a load box defining a vertically arrayed, laterally extending front wall longitudinally spaced from the cab rear wall and having vertically arrayed, longitudinally extending side walls arranged in substantially flush planar relationship with the cab side walls; and
   an auxiliary load compartment carried between the cab and the load box and including a pair of laterally spaced closure members, and each having side walls positionable to define vertically extending side surfaces in planar flush relationship with the cab and the load box side walls.

2. A pick-up truck as defined in claim 1, wherein the auxiliary load compartment comprises a laterally central base portion,
   at least one of the pair of laterally spaced closure members being hingedly secured to the base portion for movement between a closed position, wherein the closure member side walls are positioned in substantially parallel planar relationship with the cab and load box side walls, and an open position displaced therefrom.

3. A pick-up truck as defined in claim 1, wherein the closure members further include laterally extending upper walls, each spaced longitudinally from the cab and the load box.

4. A pick-up truck as defined in claim 2, wherein the closure members further include laterally extending upper walls, each spaced longitudinally from the cab and the load box.

5. A pick-up truck as defined in claim 1, and further comprising means defining a step pocket adjacent the vertically lower terminus of the closure member side wall extending laterally inwardly therefrom.

6. A pick-up truck as defined in claim 2, wherein the base portion is positioned approximate the longitudinal medial vertical plane of the pick-up truck.

7. A pick-up truck as defined in claim 2, wherein the closure members are symmetrically arrayed about the central base portion.

8. A pick-up truck as defined in claim 1, wherein the load box defines upper horizontal surfaces, and the closure members comprise upper horizontal surfaces positionable in substantially parallel planar relationship to the load box upper horizontal surfaces.

9. A pick-up truck as defined in claim 2, wherein the load box defines upper horizontal surfaces, and each closure member comprises an upper horizontal surface positionable in substantially parallel planar relationship to one of the load box upper horizontal surfaces.

10. A pick-up truck as defined in claim 1, wherein the auxiliary load compartment comprises a single U-shaped member extending laterally across the truck.

11. A pick-up truck as defined in claim 1, wherein the auxiliary load compartment comprises a laterally spaced, outwardly and upwardly opening compartment.

12. A pick-up truck as defined in claim 1, wherein the auxiliary load compartment is fabricated from molded plastic parts.

13. A pick-up truck having a generally rectangular load carrying load box, and a tab longitudinally spaced forwardly therefrom, the load box and the cab each having vertically arrayed longitudinally spaced laterally extending wall, the pick-up truck comprising an auxiliary load compartment separate from the cab and load box and positioned longitudinally intermediate therebetween.

14. A pick-up truck as defined in claim 13, wherein the auxiliary load compartment comprises:
a laterally central base portion,
at least one closure member hingedly secured to the base portion for movement between a closed position, wherein the closure member side members are positioned in substantially parallel planar relationship with the cab and load box side walls and an open position displaced therefrom.

15. A pick-up truck as defined in claim 10, wherein the closure members further include laterally extending upper wall each positioned longitudinally from the cab and the load box.

16. A pick-up truck as defined in claim 11, wherein the base portion is positioned proximate the longitudinal medial vertical plane of the pick-up truck.

17. A pick-up truck as defined in claim 11, wherein two closure members are symmetrically arrayed about the central base portion.

18. A pick-up truck as defined in claim 10, wherein the load box defines an upper horizontal surface, and the closure member comprises an upper horizontal surface arrangeable in parallel planar relationship therewith.

19. A pick-up truck as defined in claim 13, wherein he auxiliary load compartment comprises a single U-shaped member extending laterally across the truck.

20. A pick-up truck as defined in claim 13, wherein the auxiliary load compartment comprises a laterally spaced, outwardly and upwardly opening compartment.

21. A pick-up truck as defined in claim 13, wherein the auxiliary load compartment is fabricated from molded plastic parts.

* * * * *